(12) United States Patent
Aoyama et al.

(10) Patent No.: US 8,211,495 B2
(45) Date of Patent: Jul. 3, 2012

(54) NOBLE METAL PLATING OF TITANIUM COMPONENTS

(75) Inventors: Naotaka Aoyama, Toyoake (JP); Seiji Mizuno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 461 days.

(21) Appl. No.: 12/282,003

(22) PCT Filed: Apr. 10, 2007

(86) PCT No.: PCT/JP2007/058230
§ 371 (c)(1),
(2), (4) Date: Sep. 8, 2008

(87) PCT Pub. No.: WO2007/119842
PCT Pub. Date: Oct. 25, 2007

(65) Prior Publication Data
US 2009/0087558 A1 Apr. 2, 2009

(30) Foreign Application Priority Data
Apr. 14, 2006 (JP) .................................. 2006-111514

(51) Int. Cl.
*B05D 5/12* (2006.01)
*B05D 3/02* (2006.01)
(52) U.S. Cl. ...................... 427/115; 427/379; 427/383.1
(58) Field of Classification Search ................... 427/115, 427/249.1, 383.1, 428.01, 379
See application file for complete search history.

(56) References Cited

U.S. PATENT DOCUMENTS 2,893,115 A * 7/1959 McCawley ...................... 29/424

FOREIGN PATENT DOCUMENTS

| JP | 63-96295 |   | 4/1988 |
|----|----------|---|--------|
| JP | 02-043354 | * | 2/1990 |
| JP | 5-51758 |   | 3/1993 |
| JP | 10-228914 |   | 8/1998 |
| JP | 2000-353532 |   | 12/2000 |
| JP | 2002-12962 |   | 1/2002 |
| JP | 2002-60984 |   | 2/2002 |
| JP | 2003-105523 |   | 4/2003 |
| JP | 2003-105564 |   | 4/2003 |
| JP | 2003-236604 |   | 8/2003 |
| JP | 2003-297378 |   | 10/2003 |
| JP | 2003-338296 |   | 11/2003 |
| JP | 2004-31166 |   | 1/2004 |
| JP | 2004-273370 |   | 9/2004 |
| JP | 2006-97088 |   | 4/2006 |

* cited by examiner

*Primary Examiner* — Brian K Talbot
(74) *Attorney, Agent, or Firm* — Finnegan, Henderson, Farabow, Garrett & Dunner, LLP

(57) ABSTRACT

The present invention provides technology for noble metal plating of titanium surfaces. A process such as the following would be carried out when manufacturing a partially gold-plated separator for a fuel cell, for example. First, a titanium component made of titanium or titanium alloy is prepared for use as the fuel cell separator (S10). This titanium component is a titanium component whose surfaces are coated with carbon-containing substance. This titanium component is then subjected to a first heat treatment at a prescribed first temperature of between 300 and 700 degrees Celsius (S20). Gold plating of the surfaces of the heat-treated titanium component is then carried out (S80). In this way it is possible to more easily carry out gold electrolytic plating of titanium surfaces.

5 Claims, 3 Drawing Sheets

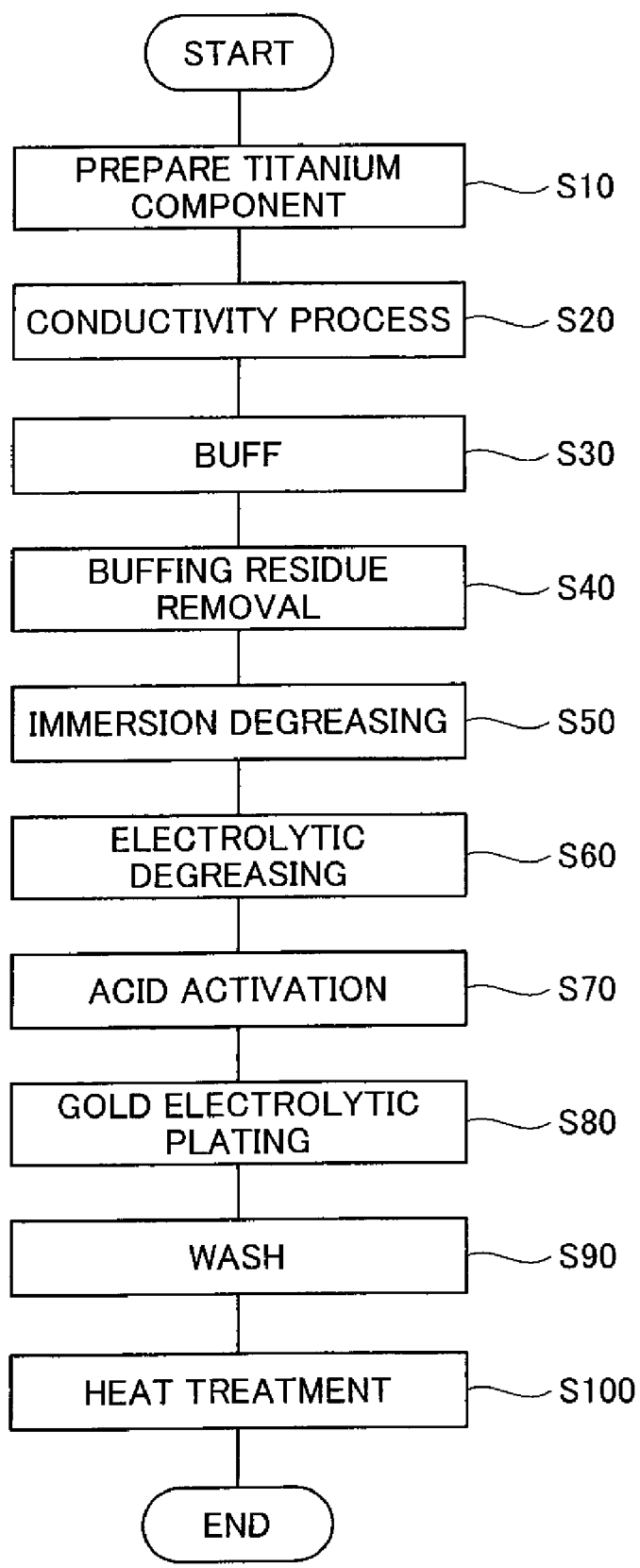

NOBLE METAL PLATING OF TITANIUM COMPONENTS

CROSS-REFERENCE TO RELATED APPLICATIONS

This application is a national phase application of International Application No. PCT/JP2007/058230, filed Apr. 10, 2007, and claims the priority of Japanese Application No. 2006-111514, filed Apr. 14, 2006, the contents of both of which are incorporated herein by reference.

TECHNICAL FIELD

This invention relates to precious metal plating, and more particularly to a technique for precious metal plating of components made of titanium or titanium alloy.

BACKGROUND ART

Where a separator intended for use in a fuel cell is composed of a material that used in unmodified form will exhibit high contact resistance with the electrodes of the fuel cell, conventional practice has been to subject the electrode-contacting portions of the separator surface to a gold plating process.

However, where a separator is formed from titanium or titanium alloy, direct electrolytic gold plating of the surface is difficult. This is due to the fact that the surfaces of a separator made of titanium or titanium alloy (herein collectively termed "titanium separator") will have a film of passive titanium oxide formed on them. On the other hand, gold plating of titanium separators will be possible if nickel plating is carried out first by way of a base plating, followed by subsequent gold plating. However, with separators produced in this way, if any defects are present in the plating on the surface, it is possible that nickel will elute from those sites. Since nickel has adverse environmental effects, there exists a need for a technology enabling gold plating to be carried out directly on titanium. Moreover, this issue is not limited to gold plating, but is widely encountered in instances where precious metal plating is carried out on articles of manufacture or components made of titanium or titanium alloy for which low contact resistance with other electrically conductive components is required.

With a view to addressing the above issues at least in part, it is an object of the present invention to provide a technique for precious metal electroplating of titanium surfaces.

The disclosure of Japanese Patent Application 2006-111514 is incorporated herein by reference.

DISCLOSURE OF THE INVENTION

In order to achieve these objects, the present invention employs a process such as the following when manufacturing a fuel cell separator that has been subjected at least in part to rate metal plating. Specifically, first, (a) titanium carbide is formed on a least a portion of a surface of a titanium component made of titanium or titanium alloy intended for use as a fuel cell separator. Then, (b) precious metal plating of at least a portion of the titanium carbide is carried out. Gold bonds to titanium carbide more strongly than to titanium oxide. It will accordingly be possible for precious metal plating to be carried out on surfaces of titanium.

In preferred practice, a process such as the following will be carried out during formation of titanium carbide on a least a portion of the surface of the titanium component. Specifically, (a1) a titanium component coated on a surface with a carbon-containing substance is prepared for use as the titanium component. Then, (a2) the titanium component is subjected to a first heat treatment at a prescribed first temperature higher than normal temperature. It will accordingly be possible to form titanium carbide on a least a portion of the surface of the titanium component.

The titanium component coated on the surface with the carbon-containing substance may be a titanium component coated with rolling mill lubricant used during rolling of the titanium component. In such an embodiment, the carbon-containing substance may be the rolling mill lubricant. It will accordingly be possible in the titanium component manufacturing process to utilize the adhering rolling mill lubricant to form the titanium carbide. For this reason it will not be necessary to provide a separate process step from the rolling process, for the purpose of applying a carbon-containing substance to form the titanium carbide.

The first temperature may preferably be a temperature lying within a range of between 300 degrees and 700 degrees Celsius. It is more preferable that the first temperature is a temperature lying within a range of between 450 degrees and 550 degrees Celsius.

It is also preferable that, as a result of the step (a), the titanium carbide is formed with nonuniform density on at least the portion of the surface of the titanium component.

When forming the titanium carbide on the surface of the titanium component, it can be formed in the following manner. At a first location included in at least the portion of the surface of the titanium component, titanium carbide is formed with a first thickness. At a second location included in at least the portion of the surface of the titanium component and different from the first location, titanium carbide is formed with a second thickness different from the first thickness.

When manufacturing a fuel cell separator, the following step may preferably be carried out: (c) the precious metal-plated titanium component is subjected to a second heat treatment at a second temperature higher than normal temperature. It will accordingly be possible to bring about diffusion of titanium hydrides present at the interface of the precious metal plating layer and the titanium component into the titanium component. As a result, stronger adhesion of the precious metal plating layer to the titanium component can be achieved.

The second temperature may preferably be a temperature lying within a range of between 220 degrees and 400 degrees Celsius.

The present invention may be reduced to practice in various ways, for example, a fuel cell separator; a method of manufacturing a fuel cell separator; a fuel cell furnished with a separator of titanium; or a method of manufacturing a fuel cell.

These and additional objects, features, and advantages of the present invention will be set forth in the following detailed description of the preferred embodiments with reference to the accompanying drawings.

BRIEF DESCRIPTION OF THE DRAWINGS

FIG. 1 is a flowchart depicting a process for manufacturing a separator according to an embodiment of the present invention;

BEST MODE FOR CARRYING OUT THE INVENTION

A. Embodiment

Figure 2A:
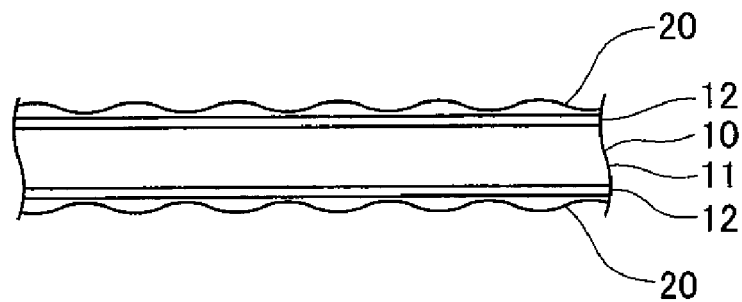
FIG. 2 is a sectional view of a plate-shaped component for separator use, depicted in different stages of the separator manufacturing process of the embodiment.
Figure 2B:
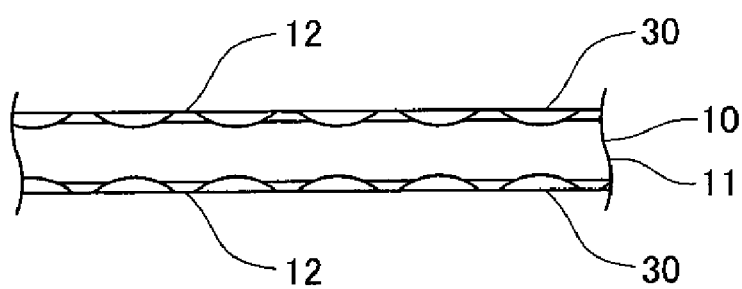
Figure 2C:
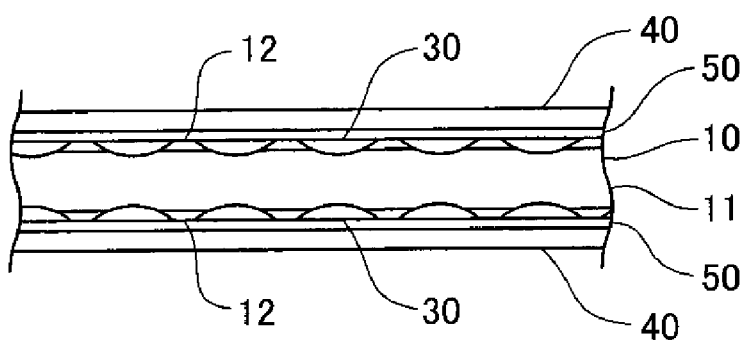
Figure 2D:
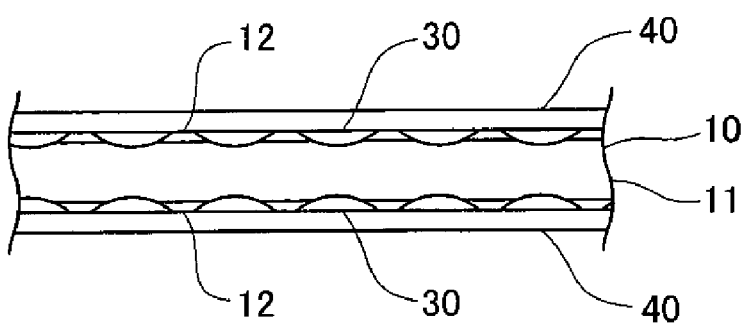

FIG. 1 is a flowchart depicting a process for manufacturing a separator according to an embodiment of the present invention. FIG. 2 is a sectional view of a plate-shaped component for separator use, depicted in different stages of the separator manufacturing process of the embodiment. During manufacture of the separator, first, in Step S10 of FIG. 1 a titanium plate-shaped component 10 for separator use intended for gold plating is prepared. The material of the plate-shaped component 10 can be JIS Class 1 pure titanium, for example. This plate-shaped component 10 is a component of plate shape produced by rolling of titanium material, and its surfaces are coated with a rolling mill lubricant 20 (see FIG. 2 (a)). The rolling mill lubricant is provided by an oil containing carbon.

In an environment in which air is present, the surfaces of the titanium component will typically be covered by a passive film of titanium oxide $TiO_2$. In FIG. 2, the portion of the plate-shaped component 10 consisting of pure titanium Ti is indicated by symbol 11, while the oxide ($TiO_2$) portions on the surface are indicated by symbol 12.

In Step S20 of FIG. 1, the plate-shaped component 10 undergoes a conductivity process. Specifically, the plate-shaped component 10 will for example be placed under an argon atmosphere at $10^{-2}$ Torr and subjected to heat treatment at 400 to 500 degrees Celsius for approximately 30 seconds. Here, the target temperature for temperature control will be set to 450 degrees. In the course of this heat treatment, carbon present in the rolling mill lubricant 20 will react with the surface portions of the titanium plate-shaped component 10, forming titanium carbide Ti—C. The titanium carbide portions of the plate-shaped component 10 are indicated by symbol 30 in FIG. 2 (b). The rolling mill lubricant 20 coating the surfaces of the plate-shaped component 10 does not adhere in strictly uniform amounts and density throughout all parts of the component. Consequently, density and thickness of the titanium carbide portions 30 will differ by location. Passive titanium oxide $TiO_2$ may still remain in some areas. That is, the surfaces of the plate-shaped component 10 will include titanium carbide Ti—C-rich portions and titanium oxide $TiO_2$-rich portions.

During manufacture of the titanium separator, prior to the process of Step S20, the titanium plate-shaped component will be subjected to a rolling step and a subsequent annealing step. Step S20 can be carried out in the final stage of this annealing step, by adjusting the temperature to between 400 degrees and 500 degrees Celsius. In actual practice, the temperature setting of between 400 degrees and 500 degrees Celsius in Step S20 will be a temperature lower than the temperature of the annealing step. Moreover, in a continuous annealing process, in most cases a washing step is carried out at the outset; however, despite having passed through the washing step, rolling mill lubricant in an amount sufficient to form titanium carbide in Step S20 will remain on the surfaces of the titanium plate-shaped component.

In S30 through S70, pretreatments are carried out prior to the electrolytic gold plating process carried out subsequently. In Step S30, the plate-shaped component 10 undergoes buffing or polishing. This buffing process uses an abrasive material to mechanically remove any carbonized rolling mill lubricant etc. coating the surfaces of the plate-shaped component 10. In the event that the surfaces are clean, it is possible to proceed directly to the process of Step S80 without going through Steps S30 through S70.

In Step S40, the plate-shaped component 10 undergoes removal of buffing residue. In this process of removing the buffing residue, any abrasive adhering to the surfaces of the plate-shaped component 10 is removed with surfactant.

In Step S50, the plate-shaped component 10 undergoes an immersion degreasing process. Specifically, the plate-shaped component 10 is immersed in an alkaline solution having NaOH as a major component. As a result, oils present on the surface of the plate-shaped component 10 will be eliminated through a saponification reaction.

In Step S60, the plate-shaped component 10 undergoes an electrolytic degreasing process. Specifically, the plate-shaped component 10 is subjected to electrolysis while immersed in an alkaline solution having NaOH as a major component. As a result, contaminants present on the surface of the plate-shaped component 10 will be lifted through the gas produced by electrolysis, in addition to the saponification reaction.

In Step S70, the plate-shaped component 10 undergoes acid activation**. Specifically, the plate-shaped component 10 is immersed in a hydrofluoric acid solution. As a result, the thin film of rust or smut present on the surfaces of the plate-shaped component 10 is removed, and the surfaces of the plate-shaped component 10 are partially dissolved to expose the metal surface. The metal which lies exposed subsequent to Step S70 will be titanium carbide, titanium hydroxide, or titanium oxide. That is, the titanium portion 11 which underlies the titanium carbide portions 30 or the titanium oxide portions 12 is not exposed.

In Step S80, the plate-shaped component 10 undergoes gold electroplating. Specifically, the plate-shaped component 10 is positioned as the cathode in a sulfurous acid bath containing gold ions or gold complex ions, and an electrical current is passed through the circuit to deposit metallic gold on the surfaces of the plate-shaped component 10. Here, the current density is 0.3 $A/dm^2$, and current flow takes place for about 10 minutes at 50 degrees Celsius. A cyanide based bath could also be used when carrying out the gold electroplating process.

Typically, the surfaces of the titanium component will be covered with passive titanium oxide $TiO_2$. For this reason, it is difficult to carry out gold electroplating of titanium components. In the present embodiment however, the surfaces of the plate-shaped component 10 are furnished in Step S20 with titanium carbide Ti—C portions 30 having higher electrical conductivity than titanium oxide $TiO_2$. For this reason, it will be possible to gold plate the surfaces of the plate-shaped component 10 in Step S80. Moreover, gold bonds more strongly with titanium carbide than to titanium oxide $TiO_2$, which is passive. Consequently, in this respect as well, according to the present embodiment it will be possible to produce gold plating which is more resistant to delamination on the titanium component. Moreover, while it has been found that the present invention may be reduced to practice in a mode having a high-conductivity film such as TiN or TiB in place of Ti—C, but better results are obtained with Ti—C.

As a result of gold electroplating carried out in Step S80, a gold plating layer 40 will be formed on the surfaces of the plate-shaped component 10 as depicted in FIG. 2 (c). In the process, a layer 50 of titanium hydroxides TiH, $TiH_2$ will form between the gold plating layer 40 and the titanium carbide portion 30. These are thought to form from hydrogen deposited on the surfaces of the plate-shaped component 10 during acid activation in Step S70, through a reaction of the hydrogen with the titanium carbide Ti—C of the plate-shaped component 10. The reason is that while Au cannot be plated onto a $TiO_2$ layer from which the Ti—C layer has been completely eliminated, formation of a TiH, $TiH_2$ layer is markedly impaired as well.

In Step S90, the plate-shaped component 10 is washed. Specifically, the plate-shaped component 10 is immersed in hot water and subjected to ultrasonic washing.

In Step S100, the plate-shaped component 10 undergoes heat treatment. Specifically, the plate-shaped component 10 is subjected to heat treatment under an argon atmosphere at $10^{-2}$ Torr for about 9 minutes at between 300 and 350 degrees Celsius. The target temperature is 330 degrees Celsius. In the course of this heat treatment, titanium hydroxide's present in the titanium hydroxide layer 50 will be diffused into the plate-shaped component 10. As a result, the layer 50 of titanium hydroxides disappears, as shown in FIG. 2 (d).

Titanium hydroxides are brittle. For this reason, if a layer 50 of titanium hydroxides TiH, $TiH_2$ is present between the gold plating layer 40 and the titanium carbide portion 30, the gold plating layer 40 will be susceptible to delamination. In the embodiment however, the titanium hydroxides present between the gold plating layer 40 and the titanium carbide portion 30 are diffused through heat treatment. Thus, the gold plating layer 40 bonds strongly to the titanium carbide portion 30 and will resist delamination from the plate-shaped component 10.

B. Example

In the example, gold plating was carried out on a titanium plate-shaped component for separator use, according to the flowchart in FIG. 1. In the process, treatment was carried out while varying the target temperature of the heat treatment in Step S20, while keeping conditions in the other steps unchanged. The conditions were as follows.
(a) The material of the plate-shaped component 10 was JIS Class 1 titanium.
(b) The conductivity process for producing Ti—C on the surfaces of the plate-shaped component 10 (see Step S20 of FIG. 1) was carried out under an argon atmosphere at $10^{-2}$ Torr for about 30 seconds, while setting the target temperature to various temperature levels between 300 and 700 degrees.
(c) Electrolytic degreasing and immersion degreasing (see Steps 50 and S60) were carried out in alkaline solution having NaOH as a major component.
(d) Acid activation (see Step S70) was carried out using hydrofluoric acid solution.
(e) Gold plating (see Step S80) was carried out in a sulfurous acid bath containing gold complex ions.
(f) Heat treatment for diffusing the titanium hydroxides (see Step S100) was carried out under an argon atmosphere at $10^{-2}$ Torr for about 9 minutes with the target temperature set to 330 degrees.

Figure 3:
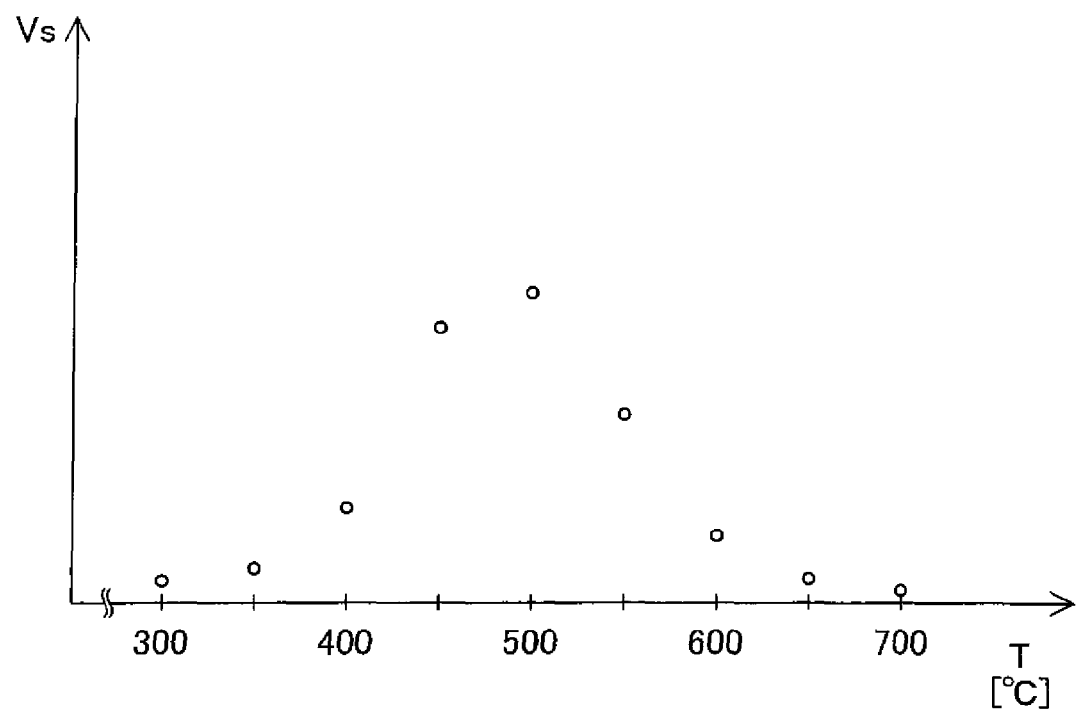
FIG. 3 is a graph depicting results of tests of adhesion of plating layers obtained through the process of FIG. 1 at different target temperatures for the heat treatment in Step S20, while keeping conditions in the other steps of FIG. 1 unchanged.

FIG. 3 is a graph depicting results of tests of adhesion Vs of plating layers obtained through the process of FIG. 1 at different target temperatures for the heat treatment in Step S20, while keeping conditions in the other steps of FIG. 1 unchanged. The tests of FIG. 3 were carried out using the tape peel method per JIS standards. As will be apparent from the graph of FIG. 3, the heat treatment of Step S20 to form the titanium carbide will preferably be carried out in a range of between 400 and 600 degrees Celsius, more preferably between 450 and 550 degrees Celsius.

A possible reason for the low adhesion of the plating layer observed at heat treatment temperatures of lower than 400 degrees Celsius is as follows. If the treatment temperature is lower than 400 degrees Celsius, carbonization of the rolling mill lubricant (which is a compound containing carbon) will not proceed, and decomposition of the rolling mill lubricant will occur with difficulty. It is thought that titanium carbide Ti—C will not readily form as a result.

On the other hand, a possible reason for the low adhesion of the plating layer observed at heat treatment temperatures above 700 degrees Celsius is as follows. It is thought that if the treatment temperature exceeds 700 degrees Celsius, most of the carbon component in the rolling mill lubricant will be transformed into gases such as carbon dioxide and driven out from the material, or will become diffused into the material so that no carbon component remains in proximity to the surfaces of the material.

Comparative tests of gold plating adhesion were carried out respectively for titanium plate-shaped components 10 having non-uniform titanium carbide formed on their surfaces through heat treatment in the above manner (see FIG. 2 (b)), and identical titanium plate-shaped components furnished with a uniform layer of titanium carbide through sputtering in place of heat treatment. The tests were carried out using the tape peel method per JIS standards. As a result, it was found that the plate-shaped components 10 having non-uniform titanium carbide formed on surfaces through heat treatment exhibited stronger adhesion of gold plating than die the plate-shaped components having uniform titanium carbide produced through sputtering.

C. Alternative Embodiments

The invention is not limited to the embodiments set forth hereinabove, and various modifications such as the following can be made without departing from the scope of the invention.

C1. Alternative Embodiment 1

In the preceding embodiment, the plate-shaped component 10 is subjected to gold plating. However, the material used to plate the surfaces of components is not limited to gold (Au), and it would be acceptable to employ other precious metals such as silver (Ag), platinum (Pt), palladium (Pd), rhodium (Rh), iridium (Ir), ruthenium (Ru), or osmium (Os).

C2. Alternative Embodiment 2

In the preceding embodiment, the plate-shaped component 10 was made of JIS Class 1 titanium. However, the component for gold plating is not limited to this. Specifically, JIS Class 2 or Class 3 titanium could be used as the material of the component for gold plating. Besides pure titanium as specified by JIS, it would also be possible to use titanium alloys containing greater amounts of other metals.

C3. Alternative Embodiment 3

In the preceding embodiment, the titanium carbide is produced through a reaction of carbon present in the rolling mill lubricant coating the surfaces of the plate-shaped component 10 with the titanium of the plate-shaped component 10. However, the carbon used to form the titanium carbide could be supplied by some other method. For example, a suitable carbon-containing material could be applied onto the surfaces of the plate-shaped component 10 prior to heat treatment.

C4. Alternative Embodiment 4

In the preceding embodiment, during formation of titanium carbide on the surfaces of the plate-shaped component 10, heat treatment is carried out under an argon atmosphere at $10^{-2}$ Torr for approximately 30 seconds at a target temperature of 450° C. However, different values could be used for temperature, pressure, and heating time during formation of the titanium carbide on the titanium component surfaces. Moreover, the process can be carried out under an atmosphere of some other inert gas, such as under a helium atmosphere. However, in preferred practice the heating temperature is at least 300° C. and no more than 700° C., preferably at least 400° C. and no more than 600° C. Still more preferably, the heating temperature is least 450° C. and no more than 550° C.

C5. Alternative Embodiment 5

In the preceding embodiment, the process of forming titanium carbide on the surfaces of the plate-shaped component 10 (Step S20 of FIG. 1) is carried out in the final stage of the annealing step. However, the step of forming titanium carbide on the titanium component surfaces is not limited to this, and may instead be carried out as a step independent from the annealing step.

C6. Alternative Embodiment 6

In the preceding embodiment, the surfaces of the plate-shaped component 10 are provided with a titanium carbide portion of nonuniform thickness through heat treatment. However, the titanium carbide could be provided onto the titanium component surfaces by some other process instead. It is also possible to provide the titanium component surfaces with a titanium carbide layer of substantially uniform thickness. However, it is preferable for the titanium carbide to be provided with nonuniform thickness on the titanium component surfaces. Herein, "titanium carbide provided with nonuniform thickness" is used to include instances where titanium carbide is absent from some portion or portions of the titanium component surfaces.

C7. Alternative Embodiment 7

In the preceding embodiment, the step of diffusing titanium hydrides (Step S100 of FIG. 1) is carried out through heat treatment under an argon atmosphere at $10^{-2}$ Torr for about 9 minutes at a target temperature of about 330° C. However, different values could be used for temperature, pressure, and heating time during heat treatment for the purpose of diffusing titanium hydrides into the titanium component which has undergone gold plating. Moreover, the process can be carried out under an atmosphere of some other inert gas, such as under a helium atmosphere. However, in preferred practice the heating temperature is at least 300° C. and no more than 400° C., preferably at least 320° C. and no more than 380° C.

C8. Alternative Embodiment 8

In yet another preferred embodiment, a fuel cell is manufactured using a separator manufactured by process of the preceding embodiment. This fuel cell includes a membrane-electrode assembly for generating power through an electrochemical reaction of reactant gases, and the aforementioned separator. The membrane-electrode assembly includes an electrolyte membrane, and electrodes disposed to either side of the electrolyte membrane. Separators are provided respectively to the electrodes on the side thereof facing away from the electrolyte membrane, and disposed with the gold-plated portions thereof contacting the electrodes.

In such a fuel cell, since the separators are made of titanium, the separators do not experience corrosion, thus affording consistent performance over an extended period. Moreover, since the gold-plated portions of the separators contact the electrodes, there is minimal contact resistance between separator and electrode. Consequently, power generation efficiency is higher in comparison to the case where the separator/electrode contact portions lack gold plating. Furthermore, since the gold plating layer and the titanium component are in contact via titanium carbide in the separator, the gold plating layer resists delamination from the titanium component.

While the present invention has been described in detail hereinabove with reference to certain exemplary preferred embodiments, this is not intended to be limiting of the invention to the specific embodiments or designs described herein. Various modifications and equivalent designs will be included within the scope of the present invention. While the various elements of the invention taught herein are disclosed in terms of various combinations and designs, these are merely illustrative, and more or fewer elements may be included therein. A single element would be acceptable as well. Such embodiments will also be considered to lie within the scope of the invention.

INDUSTRIAL APPLICABILITY

This invention is adapted for implementation in fuel cells, fuel cell systems, motors powered by fuel cells, and vehicles having a power supply that utilizes a fuel cell.

The invention claimed is:

1. A method of manufacturing a fuel cell separator plated at least in part with a noble metal, comprising the steps of:
   (a) forming titanium carbide on at least a portion of a surface of a titanium component of titanium or titanium alloy; and
   (b) subsequent to the step (a), carrying out noble metal plating of at least a portion of the titanium carbide;
   wherein the step (a) includes the steps of:
   (a1) preparing as the titanium component a titanium component coated on a surface with a carbon-containing substance, involving:
      preparing the titanium component coated with mutually differing amounts of the substance at mutually different locations included in at least the portion of the surface of the titanium component;
      forming titanium carbide with a first thickness at a first location included in at least the portion of the surface of the titanium component; and
      forming titanium carbide with a second thickness different from the first thickness at a second location included in at least the portion of the surface of the titanium component and different from the first location; and
   (a2) subjecting the titanium component to a first heat treatment at a prescribed first temperature within a range of between 450° C. and 550° C.

2. The method according to claim 1 wherein the titanium component coated on the surface with the carbon-containing substance is a titanium component coated with rolling mill lubricant used during rolling of the titanium component; and the carbon-containing substance is the rolling mill lubricant.

3. The method according to claim 1 wherein the step (a1) is a step of preparing the titanium component coated nonuniformly on the surface with the carbon-containing substance; and as a result of the step (a), the titanium carbide is formed with nonuniform density on at least the portion of the surface of the titanium component.

4. The method according to claim 1 further comprising the step of (c) subjecting the noble metal-plated titanium component to a second heat treatment at a second temperature within a range of between 220 degrees and 400 degrees Celsius.

5. The method according to claim 1, wherein as a result of the step (a), the titanium carbide is absent from at least a portion of the surface of the titanium component.

* * * * *